United States Patent Office 3,468,983
Patented Sept. 23, 1969

3,468,983
POLYETHERS CONTAINING PHOSPHORUS AND ALCOHOLIC HYDROXY GROUPS AND THEIR PRODUCTION
Hans Eberhard Praetzel, Bensberg-Frankenforst, and Herbert Jenkner, Cologne-Deutz, Germany, assignors to Chemische Fabrik Kalk G.m.b.H., Cologne-Kalk, Germany
No Drawing. Filed Dec. 20, 1965, Ser. No. 515,165
Claims priority, application Germany, Dec. 24, 1964, C 39,428
Int. Cl. C07f 9/30; C08g 33/16, 23/10
U.S. Cl. 260—953         5 Claims

ABSTRACT OF THE DISCLOSURE

Process for the production of alcoholic hydroxy group and phosphorus containing polyether products wherein white prosphorus is reacted with an alkali metal hydroxide, water, a lower alkanal or its low molecular weight condensation product in the presence of a lower alkanol at a temperature between about 30 and 75° C., the quantities of alkali metal hydroxide, water and alkanal respectively supplied to the reaction being 0.75 to 0.85, 0.75 to 0.85 and 2 to 4 mol per g-atom of the white phosphorus, distilling off the more volatile components from the reaction mixture to leave a product primarily comprising an alkali metal salt of a bis-(hydroxy alkane) phosphinic acid, reacting said crude product with at least one epoxy compound at a temperature of 50 to 160° C., the quantity of said epoxy compound being such as to provide at least 3 mol per g-atom of phosphorus contained in said crude product.

---

The present invention relates to novel phosphorus and alcoholic hydroxy group containing polyethers and to an improved process for their production from starting materials which mainly consist of bis-(hydroxy alkane) phosphinic acids or their alkali metal salts.

As is known, the bis-(hydroxy alkane) phosphinic acids can be produced by the addition of aldehydes or ketones to hypophosphorous acid. This reaction proceeds according to the following equation

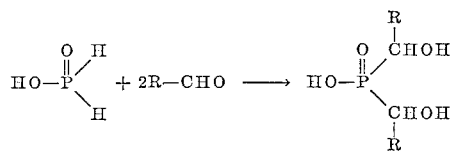

This reaction proceeds with strong evolution of heat which causes a partial disproportionation of the hypophosphorous acid to phosphine and phosphorous acid which is coupled with considerable reductions in the yields of the bis-(hydroxy alkane)-phosphinic acids.

The alkali metal salts of hypophosphorous acid are obtained by disproportionation of white phosphorus in the presence of water and alkali metal hydroxide, especially sodium or potassium hydroxide, in aqueous or alcoholic solution. This reaction can be illustrated by the following equation

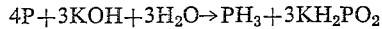

The yield of hypophosphorous acid or respectively its salt, however, is at most only 70% of theory as again disproportionation according to the following equation occurs

or

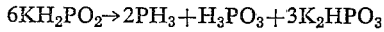

Further losses of hypophosphorous acid or respectively its salts cannot be avoided in the processing and separation of the salt mixture produced.

Therefore, high losses of phosphorus, in the form of phosphine, occur in the known procedures for the production of bis-(hydroxy alkane) phosphinic acids, which are far beyond those of the expected theoretical quantity of phosphine. In addition, several steps were required in such known process for the production of the bis-(hydroxy alkane) phosphinic acids.

It is an object of the invention to provide a process for the production of a product mainly consisting of bis-(hydroxy alkane)-phosphinic acids or respectively their alkali metal salts suitable for the production of phosphorus and alcoholic hydroxy group containing polyethers which avoid the above-mentioned disadvantages.

According to the invention this object is achieved by reacting white phosphorus with an alkali metal hydroxide, water and aldehydes in the presence of alcohols and distilling off the volatile portions of the reaction mixture to provide a crude product which can be reacted at 50 to 160° C. with epoxy compounds to produce alcoholic hydroxy and phosphorus containing polyethers. For the latter reaction at least 3 mols of the epoxy compound are provided per gram atom of phosphorus contained in the crude product.

Surprisingly, white phosphorus reacts with stoichiometric quantities of alkali metal hydroxide, water and aldehydes in the presence of alcohols to yield a quantity of non-volatile phosphorus compounds corresponding to 90% of the starting white phosphorus supplied. The remainder of the phosphorus is in part converted to phosphine. Nevertheless, the quantity of phosphine produced is considerably less than when white phosphorus is reacted with an alkali metal hydroxide and water in the absence of an aldehyde. The non-volatile products in addition to subordinate quantities of other phosphorus containing compounds, mainly are the alkali metal salts of bis-(hydroxy alkane) phosphinic acids. The non-volatile reaction products can subsequently, preferably without purification or separation, be reacted with an epoxy compound to produce the alcoholic hydroxy group and phosphorus containing polyethers.

In carrying out the process according to the invention, the white phosphorus is first introduced into a liquid saturated alcohol, such as, for example, methanol, ethanol, propanol, isopropanol, butanol, isobutanol or a mixture of such alcohols. Then 2.0 to 4.0 mol of an aldehyde per g-atom of phosphorus is added to such phosphorus and alcohol mixture while passing nitrogen therethrough and the resulting mixture heated to 30–75° C., preferably 45–65° C. At this temperature, a solution of 0.75–0.85 mol of alkali metal hydroxide, preferably sodium or potassium hydroxide, and water in a liquid saturated aliphatic alcohol per g-atom of phosphorus is added to such mixture. The total quantity of alcohol supplied to the reaction mixture should amount to about 20 mol per g-atom of phosphorus. The temperature of the reaction mixture during the reaction which proceeds with evolution of phosphine is maintained at 30–75° C., preferably 45–65° C. Unexpectedly, the quantity of phosphine produced is only 10 to 35% of the quantity which is normally produced in the production of phosphinic acid from white phosphorus. After completion of the reaction the solvent is distilled off from the reaction mixture, if desired, under reduced pressure. The residue which remains is a highly viscous mass which solidifies upon cooling down and mainly consists of the alkali metal salt of the bis-(hydroxy alkane) phosphinic acid corresponding to the alkali metal hydroxide and the aldehyde employed. The crude product is employed directly for the production of the alcoholic hydroxy group and phosphorus containing polyethers.

For this purpose, for example, the crude product can be reacted with 3 to 10 mol of epichlorohydrin per g-atom of phosphorus contained therein. In this reaction, on one hand, the hydroxy alkane groups of the alkali metal salts of the bis-(hydroxy alkane) phosphinic acid are etherified with the secondary alcohol groups formed by opening of the epoxy (oxirane) ring and, on the other hand, the phosphinic acid group is esterified with formation of an alkali metal chloride, to produce the alcoholic hydroxy group and phosphorus containing polyethers.

The etherification of the reaction products which primarily consist of the alkali metal salts of bis-(hydroxy alkane) phosphonic acid can, however, also be carried out with epoxy compounds other than epichlorohydrin, such as, for example, ethylene oxide, propylene oxide, styrene oxide, epibromohydrin, glycidol. Such epoxy compounds (2 to 5 mol of) are employed per g-atom of phosphorus in the reaction product, preferably under superatmospheric pressure up to 100 atmospheres and the reaction mixture is heated to temperatures up to 160° C. In such etherification a partial esterification of the phosphinic acid groups also takes place simultaneously. Nevertheless the acid numbers of the polyethers thus obtained is normally still too high. As a consequence they are then normally given an aftertreatment with epichlorohydrin to effect the necessary esterification, for example, by boiling the alkali metal salts of the phosphinic acid polyethers with epichlorohydrin under reflux until the acid number has been reduced to 6–3 and less, followed by distilling off the excess epichlorohydrin. It can be of advantage for the progress of the reaction to introduce a small quantity of alkali metal chloride into the reaction mixture together with the epichlorohydrin. Quantities of 0.5 to 5.0 parts by weight of alkali metal chloride per 100 parts by weight of epichlorohydrine can already suffice. The quantity suited for the special case at hand can be easily ascertained by simple preliminary tests.

Aliphatic aldehydes, such as, the lower alkanals, formaldehyde, acetaldehyde, propionaldehyde, butyraldehyde and their low molecular weight polymers or condensation products, such as, paraformaldehyde, trioxane and aldol are suitable for carrying out the process according to the invention. Formaldehyde is employed either as a solution in methanol or it is introduced into the reaction mixture in gaseous form either during the reaction or during the addition of the alkali metal hydroxide.

The alcoholic hydroxy group and phosphorus containing polyethers obtained according to the invention are colorless to light yellow viscous liquids. Their phosphorus content is about 3–12 weight percent, the hydroxy numbers thereof are from 60 to 400 and their acid numbers are from 6–2. Such polyethers are suited for the production of self-extinguishing polyurethanes. The alcoholic hydroxy groups contained in the polyethers can react with isocyanate groups with the formation of polymeric molecules in which the phosphorus is bound to the polymer chains so as to provide lasting flameproofing action. As the phosphorus atoms in the polyethers produced according to the invention are bound to the alcoholic hydroxy groups over P–C bonds, hydrolytic cleavage of the phosphorus from the macromolecules is also practically out of the question.

The process according to the invention is illustrated in the following examples but such process is not limited thereto. In such examples the proportions are given in parts by weight unless specified otherwise.

EXAMPLE 1

225 parts of paraformaldehyde were added to:

(a) 93 parts of white phosphorus under 840 parts of methanol and the reaction vessel rinsed with nitrogen. The mixture was then heated to about 55° C. and 93.8 parts of NaOH dissolved in 42.4 parts of $H_2O$ and 810 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum. A tough mass which solidified on cooling remained as the residue. The yield was 406 parts of a crude product with a 21 weight percent of phosphorus. Therefore 92.5 weight percent of the phosphorus supplied had been converted to non-volatile compounds.

(b) 37 parts of this crude product which primarily consisted of the sodium salt of bis-(hydroxy methane) phosphinic acid were then directly reacted with 116 parts of epichlorohydrin by boiling under reflux while stirring. Sodium chloride separated out during the course of this reaction. After the reaction was completed the sodium chloride was filtered off and the filtrate obtained cooled down. The excess of epichlorohydrin was then distilled off from the filtrate under reduced pressure. 112 parts of a viscous light yellow polyether product remained as the residue. Such product contained 20.3 weight percent of chlorine, 8.6 weight percent of phosphorus and had a hydroxy number of 264 and an acid number of 3. About 2.9 mol of epichlorohydrin had reacted per g-atom of phosphorus supplied.

EXAMPLE 2

225 parts of paraformaldehyde were used to:

(a) 93 parts of white phosphorus under 840 parts of methanol and the reaction vessel rinsed with nitrogen. The mixture was then heated to about 55° C. and 132 parts of KOH dissolved in 42.4 parts of $H_2O$ and 830 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum. A tough mass which solidified on cooling remained as the residue. The yield was 406 parts of a crude product with a 19.0 weight percent of phosphorus. Therefore 91.5 weight percent of the phosphorus supplied had been converted to non-volatile compounds.

(b) 328 parts of this crude product which primarily consisted of the potassium salt of bis-(hydroxy methane) phosphinic acid were then directly reacted with 127 parts of propylene oxide for 2½ hours at 120° C. while shaking. 451 parts of a water clear, viscous liquid with a phosphorus content of 12.9 weight percent were obtained. This product was again reacted with 119 parts of propylene oxide under the same conditions. 564 parts of a water clear, viscous liquid with a phosphorus content of 11.1 weight percent were obtained. The reaction product was then heated while stirring under reflux with 250 parts of epichlorohydrin. Potassium chloride separated out and after the reaction was completed the potassium chloride was filtered off and the filtrate obtained cooled down. The excess of epichlorohydrin was then distilled off from the filtrate under reduced pressure. 460 parts of a viscous light yellow polyether product remained as the residue.

Such product contained 3.8 weight percent of chlorine, 10.8 weight percent of phosphorus and had a hydroxy number of 348 and an acid number of 4.

EXAMPLE 3

36 parts of paraformaldehyde were added to:

(a) 14.9 parts of white phosphorus under 160 parts of methanol and the reaction vessel rinsed with nitrogen. The mixture was then heated to about 55° C. and 15 parts of NaOH dissolved in 6.8 parts of $H_2O$ and 145 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours and after cooling it was filtered to remove the slight clouding thereof. The methanol was removed from the filtrate by distillation which towards the end was carried out under vacuum.

(b) The crude product obtained which primarily consisted of the sodium salt of bis-(hydroxy methane) phosphinic acid was then directly reacted with 240 parts of styrene oxide under reflux while stirring. After completion of the reaction the excess styrene oxide was distilled off. 228 parts of a viscous product with a phosphorus content of 6.5 weight percent remained as the residue. About 2.56 mol of styrene oxide reacted per g-atom of phophorus supplied. The reaction product was then heated under reflux while stirring with 70 parts of epichlorohydrin. Sodium chloride separated off during the course of the reaction. After the reaction was completed the sodium chloride was filtered off and the filtrate obtained cooled down. The excess of epichlorohydrin was then distilled off from the filtrate under reduced pressure. 228 parts of a viscous light yellow polyether product remained as the residue. Such product contained 2.0 weight percent of chlorine, 5.3 weight percent of phosphorus and had a hydroxy number of 250 and an acid number of 2.5. About 1.25 mol of epichlorohydrin had reacted per g-atom of phosphorus supplied.

EXAMPLE 4

86.52 parts of butyraldehyde were added to:

(a) 14.9 parts of white phosphorus under 160 parts of methanol and the reaction vessel rinsed with nitrogen. The mixture was then heated to 50° C. and 15 parts of NaOH dissolved in 6.8 parts of $H_2O$ and 155 parts of methanol added thereto slowly while continuously stirring. During the reaction a mixture of nitrogen and phosphine escaped. The reaction solution was maintained at 50° C. for 3 further hours and the methanol and excess butyraldehyde then distilled off, towards the end under vacuum. 97 parts of reaction product remained as a tough viscous mass.

(b) 97 parts of the crude product which primarily consisted of the sodium salt of bis-(hydroxy butane) phosphinic acid was then directly reacted with 185 parts of epichlorohydrin while stirring under reflux. During the course of the reaction NaCl separated out. After the reaction was completed the sodium chloride was filtered off and the filtrate obtained cooled down. The excess of epichlorohydrin was then distilled off from the filtrate under reduced pressure. 212 parts of a viscous light yellow polyether product remained as the residue. Such product contained 7.2 weight percent of chlorine, 11.2 weight percent of phosphorus and had a hydroxy number of 304 and an acid number of 3. About 1.5 mol of epichlorohydrin had reacted per g-atom of phosphorus supplied.

EXAMPLE 5

52.86 parts of aldol were added to:

(a) 7.45 parts of white phosphorus under 80 parts of methanol and the reaction vessel rinsed with nitrogen. The mixture was then heated to about 55° C. and 7.5 parts of NaOH dissolved in 3.4 parts of $H_2O$ and 75 parts of methanol added slowly thereto while continuously introducing nitrogen into such mixture. The paraformaldehyde dissolved in a short period of time and a mixture of nitrogen and phosphine escaped. The reaction solution was maintained at 55° C. for 3 further hours. Thereafter the methanol and excess aldol were distilled off, towards the end under vacuum.

(b) The crude product which primarily consisted of the sodium salt of bis-(1,3-dihydroxy butane) phosphinic acid was then directly heated with 162 parts of epichlorohydrin under reflux while stirring. Sodium chloride separated out during the course of the reaction. After the reaction was completed the sodium chloride was filtered off and the filtrate obtained cooled down. The excess of epichlorohydrin was then distilled off from the filtrate under reduced pressure. 136.2 parts of a viscous polyether product remained as the residue. Such product contained 18.5 weight percent of chlorine, 6.2 weight percent of phosphorus and had a hydroxy number of 430 and an acid number of 6. About 3.5 mol of epichlorohydrin had reacted per g-atom of phosphorus supplied.

EXAMPLE 6

97 parts of the crude product of Example 4(a) which mainly consisted of the sodium salt of bis-(hydroxy butane) phosphinic acid were heated together with 185 parts of epichlorohydrin to which 2 parts of NaCl had previously been added while stirring under refluxing conditions. During the course of the reaction further NaCl separated out very quickly. After completion of the reaction the NaCl was filtered off and the filtrate cooled. Thereafter the excess epichlorohydrin was distilled off under vacuum. 239 parts of a light yellow viscous product with a chlorine content of 7.9 weight percent, a phosphorus content of 10.3 weight percent, a hydroxy number of 283 and an acid number of 2.0 were obtained as the residue. About 1.8 mol of epichlorohydrin had reacted per g-atom of phosphorus in the starting material.

We claim:

1. A viscous liquid polyether product containing alcoholic hydroxyl groups and phosphorus obtained by reaction of an alkali metal salt of a bis-($\alpha$-hydroxy lower alkane) phosphinic acid with an epoxy compound selected from the group consisting of epichlorohydrin, epibromohydrin, ethylene oxide, propylene oxide, styrene oxide and glycidol at a temperature between 50 and 160° C. and containing 3–12 weight percent of organically bound phosphorus and having a hydroxyl number of about 60 to 400 and an acid number of about 2–6.

2. A process for the production of alcoholic hydroxy group and phosphorus containing polyethers which comprises reacting white phosphorus with an alkali metal hydroxide, water and a lower alkanal or its equivalent low molecular weight condensation product in the presence of a lower alkanol at a temperature between 30 and 75° C., the quantities of alkali metal hydroxide, water and alkanal respectively supplied to the reaction being 0.75 to 0.85, 0.75 to 0.85 and 2 to 4 mol per g-atom of the white phosphorus, distilling off the more volatile components from the reaction mixture to leave a product primarily comprising an alkali metal salt of a bis-(hydroxy alkane) phosphinic acid, reacting said crude product with at least one epoxy compound at a temperature of 50 to 160° C., the quantity of such epoxy compound being such as to provide at least 3 mol per g-atom of phosphorus contained in said crude product.

3. The process of claim 2 in which said epoxy compound is selected from the group consisting of epichlorohydrin, epibromohydrin, ethylene oxide, propylene oxide, styrene oxide and glycidol.

4. The process of claim 3 in which the epoxy compound is epichlorohydrin and the reaction thereof with the crude product being in contact with 0.5 to 5 parts by weight of NaCl supplied from an external source per 100 parts by weight of the epichlorohydrin.

5. The process of claim 3 in which the crude product is first reacted with an epoxy compound selected from the group consisting of ethylene oxide, propylene oxide, styrene oxide and glycidol, the quantity supplied being 2 to 5 mol per g-atom of phosphorus contained in said crude product and the resulting polyether is then reacted with epichlorohydrin, the quantity of epichlorohydrin supplied being at least 1 mol per g-atom of phosphorus contained in said crude product.

No references cited.

CHARLES B. PARKER, Primary Examiner

ANTON H. SUTTO, Assistant Examiner

U.S. Cl. X.R.

260—77.5, 502.4, 978